(12) United States Patent
Altamura et al.

(10) Patent No.: US 11,885,267 B2
(45) Date of Patent: Jan. 30, 2024

(54) GAS TURBINE ENGINE

(71) Applicant: GE Avio S.r.l., Rivalta di Torino (IT)

(72) Inventors: Paolo Altamura, Monopoli (IT);
Michele Gravina, Minervino Murge (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 17/578,806

(22) Filed: Jan. 19, 2022

(65) Prior Publication Data
US 2023/0048465 A1    Feb. 16, 2023

(30) Foreign Application Priority Data

Jul. 8, 2021   (IT) ................. 102021000018032

(51) Int. Cl.
*F02C 7/36*   (2006.01)
*F02C 7/06*   (2006.01)
*F02K 3/072*  (2006.01)

(52) U.S. Cl.
CPC ............ *F02C 7/36* (2013.01); *F02C 7/06* (2013.01); *F02K 3/072* (2013.01); *F05D 2240/52* (2013.01); *F05D 2260/40311* (2013.01)

(58) Field of Classification Search
CPC .... F02C 7/36; F02C 7/06; F02C 3/067; F02C 3/107; F02C 3/113; F02K 3/072; F05D 2260/40311; F05D 2240/52; F05D 2250/44; F01D 1/24; F01D 1/26; F16H 2001/2872; F16H 2001/2881; F16H 1/28
See application file for complete search history.

(56) References Cited

U.S. PATENT DOCUMENTS

| | | | |
|---|---|---|---|
| 3,861,139 A | 1/1975 | Jones | |
| 3,903,690 A | 9/1975 | Jones | |
| 5,010,729 A * | 4/1991 | Adamson | ............... F02K 3/072 |
| | | | 416/129 |
| 7,451,592 B2 | 11/2008 | Taylor et al. | |
| 7,624,565 B2 | 12/2009 | Murrow et al. | |
| 7,926,259 B2 * | 4/2011 | Orlando | .................... F02C 7/36 |
| | | | 60/268 |

(Continued)

FOREIGN PATENT DOCUMENTS

| | | |
|---|---|---|
| CN | 102767610 A | 11/2012 |
| DE | 102004059735 A1 | 6/2006 |

(Continued)

*Primary Examiner* — Christopher Verdier
*Assistant Examiner* — Ryan C Clark
(74) *Attorney, Agent, or Firm* — Dority & Manning, P.A.

(57) ABSTRACT

A gas turbine engine includes a fan assembly having a plurality of fan blades; and a turbomachine. The turbomachine includes a compressor section, a combustion section, and a turbine section in serial flow order. The turbomachine further including a first input power source; a second input power source configured to counter-rotate relative to the first input power source; a power output component operably connected to the fan assembly; and a gear assembly located forward of the combustion section of the turbomachine, the gear assembly configured to receive power from the first input power source and the second input power source and provide power to the power output component, the gear assembly comprising a helical gear.

20 Claims, 10 Drawing Sheets

(56) References Cited

U.S. PATENT DOCUMENTS

| | | | |
|---|---|---|---|
| 8,008,798 B2 * | 8/2011 | Jansen | F03D 15/10 |
| | | | 290/55 |
| 8,015,798 B2 | 9/2011 | Norris et al. | |
| 8,336,290 B2 | 12/2012 | Glynn et al. | |
| 8,517,672 B2 | 8/2013 | McCooey | |
| 8,863,643 B2 | 10/2014 | Powell | |
| 9,631,702 B2 | 4/2017 | Chhour | |
| 10,227,928 B2 | 3/2019 | Kuhne et al. | |
| 10,428,741 B2 | 10/2019 | Venter | |
| 10,781,755 B2 | 9/2020 | McCune | |
| 2006/0254253 A1 * | 11/2006 | Herlihy | F02C 7/36 |
| | | | 60/39.162 |
| 2007/0084184 A1 * | 4/2007 | Orlando | F01D 1/26 |
| | | | 60/226.1 |
| 2008/0120839 A1 * | 5/2008 | Schilling | F02C 7/36 |
| | | | 60/226.1 |
| 2012/0192570 A1 * | 8/2012 | McCune | F02K 3/06 |
| | | | 60/792 |
| 2013/0192256 A1 | 8/2013 | Suciu et al. | |
| 2013/0195624 A1 | 8/2013 | Schwarz et al. | |
| 2014/0271135 A1 * | 9/2014 | Sheridan | F02C 7/36 |
| | | | 415/122.1 |
| 2014/0312177 A1 | 10/2014 | Gaonjur | |
| 2015/0354502 A1 * | 12/2015 | Kuhne | F02K 3/072 |
| | | | 60/226.1 |
| 2015/0377066 A1 * | 12/2015 | Duong | F16H 57/0436 |
| | | | 418/229 |
| 2016/0025003 A1 * | 1/2016 | Schwarz | F02K 3/06 |
| | | | 415/69 |
| 2016/0097330 A1 * | 4/2016 | Venter | F02C 3/04 |
| | | | 415/122.1 |
| 2016/0298539 A1 * | 10/2016 | Roberge | F02K 3/072 |
| 2018/0142733 A1 * | 5/2018 | Venter | F16C 19/362 |
| 2018/0209350 A1 * | 7/2018 | Kupratis | F02C 3/113 |
| 2018/0320632 A1 * | 11/2018 | Clements | F02K 3/06 |
| 2018/0355951 A1 | 12/2018 | Stuart et al. | |
| 2019/0162292 A1 * | 5/2019 | Nique | F16H 1/2836 |
| 2019/0360578 A1 * | 11/2019 | Chevillot | F16H 57/0456 |
| 2019/0368577 A1 * | 12/2019 | Ronchiato | F01D 25/164 |

FOREIGN PATENT DOCUMENTS

| | | |
|---|---|---|
| EP | 1113193 A2 | 7/2001 |
| KR | 200407226 Y1 | 1/2006 |
| RU | 2528236 C1 | 9/2014 |

* cited by examiner

US 11,885,267 B2

GAS TURBINE ENGINE

CROSS-REFERENCE TO RELATED APPLICATIONS

This application claims priority to Italian Patent Application No. 102021000018032, filed Jul. 8, 2021, which is a non-provisional application, and wherein the above application is hereby incorporated by reference in its entirety.

FIELD

The present subject matter relates generally gas turbine engines including gear assemblies.

BACKGROUND

A ducted turbofan engine operates on the principle that a turbomachine drives a fan assembly, the fan assembly being located at a radial location between a nacelle of the engine and the turbomachine. With an open rotor turbofan engine, by contrast, the fan assembly is not bound by a nacelle, and thus may include a fan assembly having a larger diameter. A gearbox may be provided at an axial location between the fan and a power turbine of the turbomachine.

In either case, the turbomachine may include a compressor section, a combustion section, and a turbine section in serial flow order. Traditionally, the turbine section includes a turbine having a turbine having a plurality of stages of turbine rotor blades coupled to one another for extracting energy from combustion gasses from the combustion section. Positioned between the stages of turbine rotor blades are stages of stator vanes to straighten the flow of combustion gasses and increase an efficiency of the turbine.

Counter-rotating turbines have been proposed whereby alternating stages of counter-rotating turbine rotor blades are provided, obviating the need for at least some of the stages of turbine rotor blades, potentially reducing a length and weight of the turbine section. However, challenges may arise in how to utilize the counter-rotating outputs from such a turbine. Accordingly, a means for effectively using the counter-rotating outputs from such a turbine would be useful.

BRIEF DESCRIPTION

Aspects and advantages of the present disclosure will be set forth in part in the following description, or may be obvious from the description, or may be learned through practice of the present disclosure.

In one exemplary embodiment of the present disclosure, a gas turbine engine is provided. The gas turbine engine includes a fan assembly having a plurality of fan blades; and a turbomachine. The turbomachine includes a compressor section, a combustion section, and a turbine section in serial flow order. The turbomachine further including a first input power source; a second input power source configured to counter-rotate relative to the first input power source; a power output component operably connected to the fan assembly; and a gear assembly located forward of the combustion section of the turbomachine, the gear assembly configured to receive power from the first input power source and the second input power source and provide power to the power output component, the gear assembly comprising a helical gear.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1A:
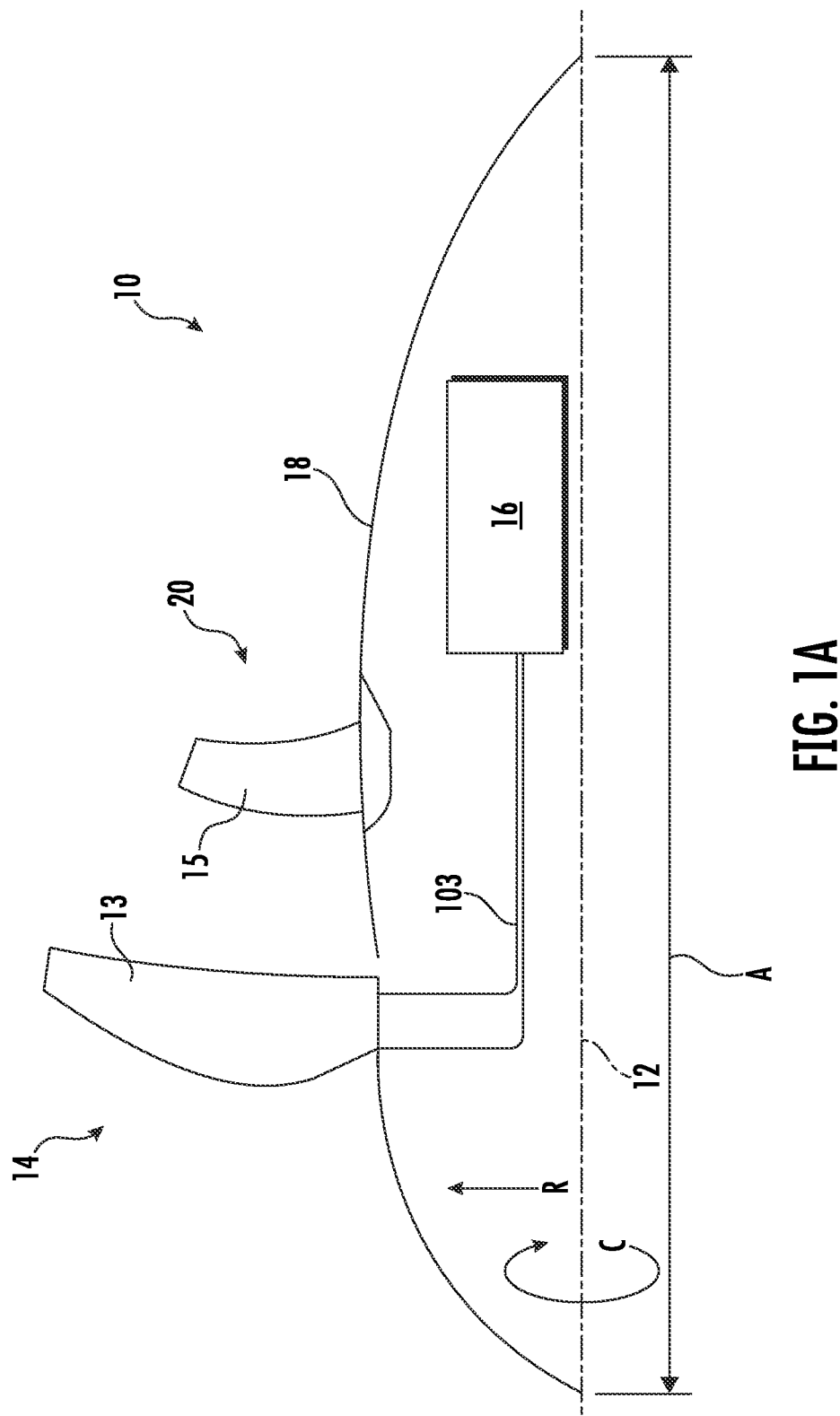
FIG. 1A is a schematic, side view of a gas turbine engine according to an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "proximate" means closer to one object than another. For example, the phrase "A is proximate X relative to Y" means the object A is closer to object X than it is to object Y.

The term "turbomachine" or "turbomachinery" refers to a machine including one or more compressors, a combustion section, and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc. Unless otherwise specified or made clear by the context, the term gas turbine engine is not limited to aeronautical gas turbine engines, and may include industrial gas turbine engines, aeronautical gas turbine engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, shaft or spool components, etc. each refer to relative speeds within an engine unless otherwise specified. For example, a "low turbine" or "low speed turbine" refers to a component configured to operate at a rotational speed, such as a maximum allowable rotational speed, lower than a "high turbine" or "high speed turbine" of the engine.

The term "helical gear" refers to a type of cylindrical gear with a slanted tooth trace inclined in one or more directions. Helical gear may refer to a single helical gear, a double helical gear, etc.

Figure 7:
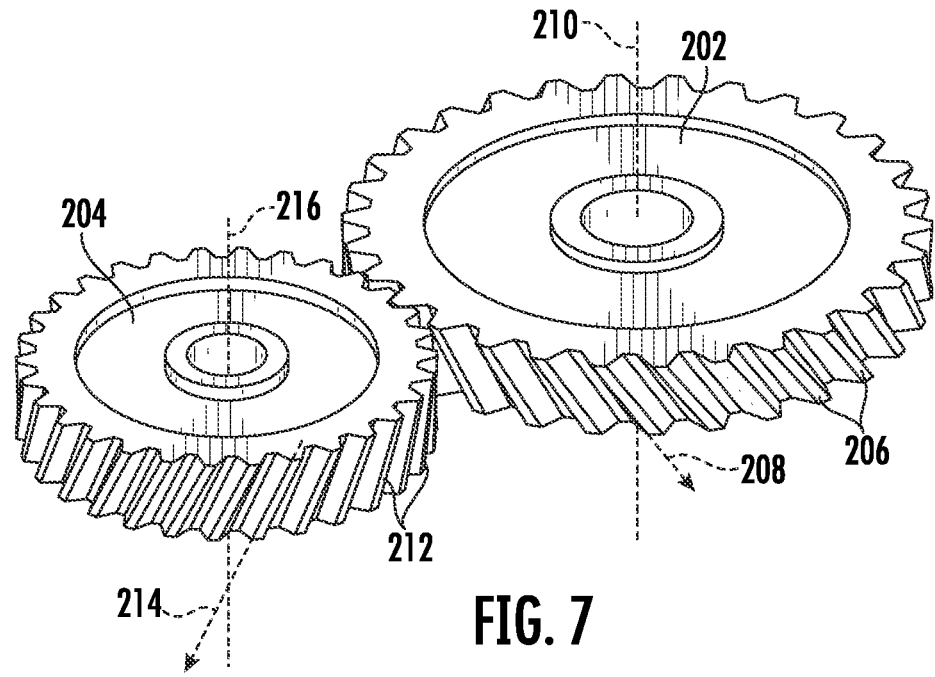
FIG. 7 is a perspective view of a pair of single helical gears in accordance with an exemplary embodiment of the present disclosure.

The term "single helical gear" refers to refers to a type of cylindrical gear with a slanted tooth trace inclined in one direction, as further defined and described below with reference to FIGS. 7 and 8. Single helical gears generally allow for a large contact ratio and provide a reduced vibration while being capable of transmitting a large force in a direction parallel to their centerlines.

Figure 11:
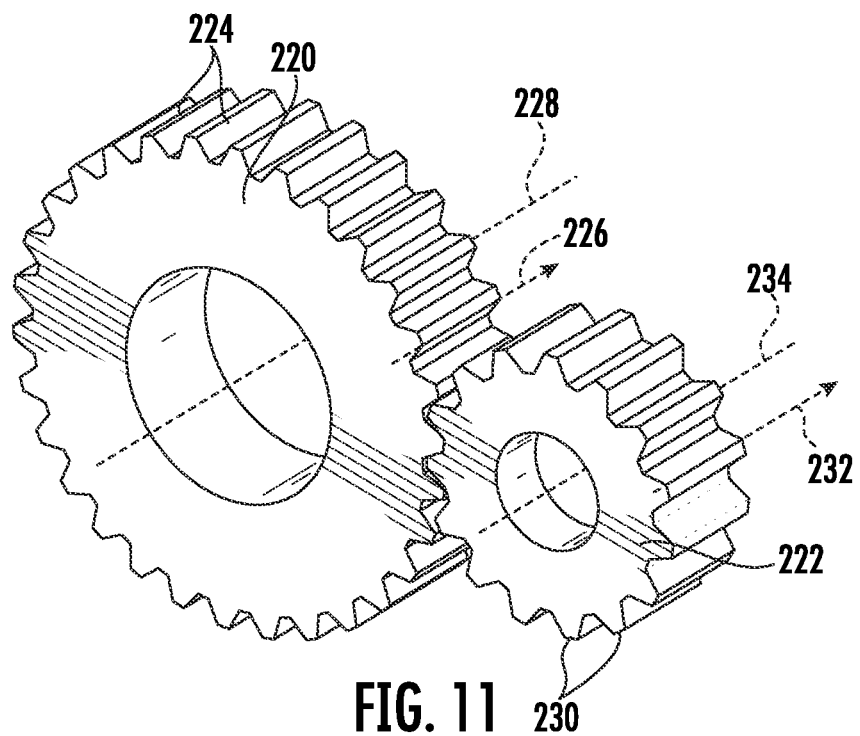
FIG. 11 is a perspective view of a pair of spur gears in accordance with an exemplary embodiment of the present disclosure.
Figure 12:
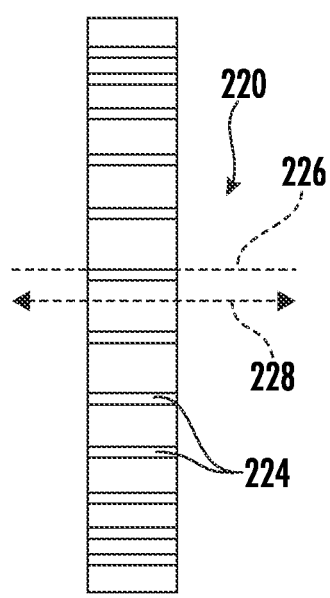
FIG. 12 is a plan view of a first of the pair of spur gears of FIG. 11.

The term "spur gear" refers to a type of cylindrical gear wherein an edge of each tooth is straight and aligned parallel to a centerline of the gear, or rather to an axis of rotation of the gear, as further defined and described below with reference to FIGS. 11 and 12. Spur gears generally allow for transmission of torque within transmitting force in a direction parallel to their centerlines.

The term "thrust bearing" refers to a bearing that is capable of supporting an axial load between a first component and a second component. In some embodiments, the thrust bearing may be a ball bearing, a tapered roller bearing, a fluid bearing, a spherical roller bearing, or the like.

The term "non-thrust bearing" refers to a bearing that is not capable of supporting a substantial axial load (e.g., not capable of withstanding an axial load greater than 10% or 5% of a radial load capacity of the bearing). In some embodiments, the non-thrust bearing may be a roller bearing, a fluid bearing, or the like.

Thrust bearings and non-thrust bearings in accordance with the present disclosure may be formed of a metal material, a metal alloy, a ceramic, or any other suitable material. In alternative embodiments, the thrust bearing and/or non-thrust bearing may be a fluid bearing.

The term "gear ratio" without a modifier refers to a maximum gear ratio for a gear assembly.

The term "maximum gear ratio" refers to a gear ratio for a gear assembly measured as the ratio of a rotational speed quickest input (in RPM) to a rotational speed of the output (also in RPM).

The term "minimum gear ratio" refers to a gear ratio for a gear assembly measured as the ratio of a rotational speed slowest input (in RPM) to a rotational speed of the output (also in RPM).

In certain exemplary aspects of the present disclosure, a gas turbine engine is provided having a fan assembly and a turbomachine. The turbomachine generally includes a compressor section, a combustion section, and a turbine section in serial flow order. The turbomachine further includes a first input power source, a second input power source configured to counter-rotate relative to the first input power source, and a power output component operably connected to the fan assembly for driving a plurality of fan blades of the fan assembly.

For example, the turbine section of the turbomachine may include a counterrotating turbine having a first plurality of turbine rotor blades configured to rotate in a first direction and a second plurality of turbine rotor blades configured to rotate in a second direction opposite the first direction. The first plurality of turbine rotor blades may be interdigitated with the second plurality of turbine rotor blades (e.g., alternatingly spaced). The first input power source may be rotatable with the first plurality of turbine rotor blades and the second input power source may be rotatable with the second plurality of turbine rotor blades.

The exemplary gas turbine engine noted above further includes a gear assembly located forward of the combustion section of the turbomachine configured to receive power from the first input power source and the second input power source and further configured to provide power to the power output component. In such a manner, the gear assembly may facilitate driving the power output component and fan assembly with rotational power provided from the first input power source and from the second input power source.

More specifically, for at least one embodiment, the gear assembly includes at least one helical gear, such as a single helical gear. For example, the gear assembly may define a first torque path extending from the first input power source to the power output component and a second torque path extending from the second input power source to the power output component. The gear assembly may include the at least one single helical gear within the first torque path or within the second torque path. For example, in at least some embodiments, the gear assembly may include single helical gears throughout the first torque path, throughout the second torque path, or both such that the only gears utilized to transfer torque in the first torque path, the second torque path, or both are single helical gears.

With such an exemplary embodiment, the engine may be configured to provide all or a portion of an axial load experienced by the fan assembly during operation of the engine from the power output component to the first input power source, the second input power source, or both. Utilization of single helical gears may provide such functionality in an axially compact package. As will be appreciated, the first input power source, the second input power source, or both may be rotatable with a turbine of the turbine section. During operation of the gas turbine engine, the turbine(s) may experience an axial load in a direction opposite a direction of the axial load experienced by the fan assembly. Accordingly, by providing the transfer of an axial load from the power output component to the first input power source, the second input power source, or both, a net axial load that must be absorbed by a thrust bearing may be reduced.

Further, in the above exemplary embodiment, or in an alternative exemplary embodiment, the gas turbine engine may include an inter-shaft bearing positioned between the first input power source and the power output component. Such may provide a desired stabilization.

Moreover, such a configuration provides an opportunity to provide an additional or alternative path for transferring an axial load experienced by the fan assembly to the first input power source, the second input power source, or both. In order to facilitate such a transfer, a net axial load must be absorbed by a thrust bearing during operation of the engine. More specifically, in certain embodiments, the inter-shaft bearing may be configured as a thrust bearing. In such an exemplary aspect, all or a portion of an axial load on the fan assembly during operation of the engine may transfer from the power output component, through the inter-shaft bearing (configured as a thrust bearing), and to first input power source. The inter-shaft bearing may therefore allow for axial loads acting on a turbine of the turbine section to at least partially offset axial loads acting on the fan assembly during operation of the engine. Accordingly, by providing the transfer of an axial load from the power output component to the first input power source, a net axial load that must be absorbed by a thrust bearing may be reduced. With such a configuration, the engine may further include a thrust bearing on, e.g., the power output component to ground the assembly.

Further, still, in one or both of the above exemplary embodiments, or in an alternative exemplary embodiment, the gas turbine engine may further include a first thrust bearing located forward of the combustion section of the turbomachine and supporting the first input power source, as well as a second thrust bearing located forward of the combustion section of the turbomachine and supporting the second input power source. Such a configuration may provide unique benefits for a turbomachine including a counterrotating turbine. For example, by locating both of the first and second thrust bearings forward of the combustion section, such as proximate the gear assembly relative to the combustion section, any thermal expansion experienced by the first input power source between the first thrust bearing and a first plurality of turbine rotor blades of the counterrotating turbine to which the first input power source is coupled will have a minimal effect on axial clearances between the first plurality of turbine rotor blades and a second plurality of turbine rotor blades of the counterrotating turbine to which the second input power source is coupled, as a similar thermal expansion will be experienced by the second input power source.

Referring now to the drawings, FIG. 1A is an exemplary embodiment of an engine 10 according to aspects of the present disclosure. The engine 10 defines an axial direction A and an axial centerline 12 extending along the axial direction A, a radial direction R relative to the axial centerline 12, and a circumferential direction C extending about the axial centerline 12.

The engine 10 includes a fan assembly 14 and a turbomachine 16. In various embodiments, the turbomachine 16 is a Brayton cycle system configured to drive the fan assembly 14. The turbomachine 16 is shrouded, at least in part, by an outer casing 18. The fan assembly 14 includes a plurality of fan blades 13. A vane assembly 20 is provided extending from the outer casing 18. The vane assembly 20 includes a plurality of vanes 15 positioned in operable arrangement with the fan blades 13 to provide thrust, control thrust vector, abate or re-direct undesired acoustic noise, or otherwise desirably alter a flow of air relative to the fan blades 13. In some embodiments, the fan assembly 14 includes between three (3) and twenty (20) fan blades 13. In certain embodiments, the vane assembly 20 includes an equal or fewer quantity of vanes 15 to fan blades 13, or a higher quantity of vanes 15 to fan blades 13.

In certain embodiments, such as depicted in FIG. 1A, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13, such as to control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above.

In certain embodiments, such as depicted in FIG. 1A, the engine 10 is an unducted thrust producing system, such that the plurality of fan blades 13 is unshrouded by a nacelle or fan casing. As such, in various embodiments, the engine 10 may be referred to as an unshrouded turbofan engine or an open rotor engine. In particular embodiments, the engine 10 is a single unducted rotor engine including a single row of unducted fan blades 13.

Figure 1B:
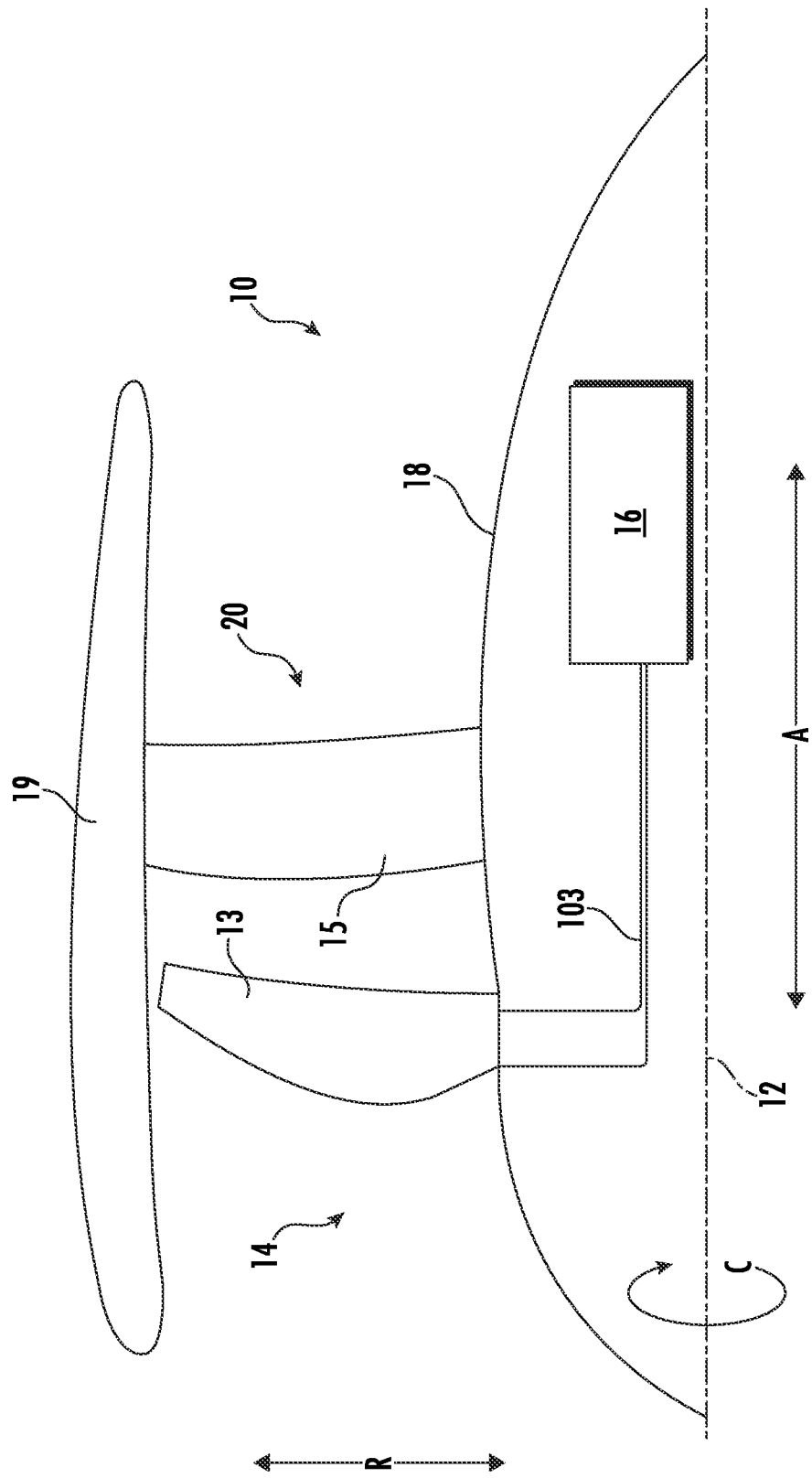
FIG. 1B is a schematic, side view of a gas turbine engine according to another exemplary embodiment of the present disclosure.

It will be appreciated, however, that in other exemplary embodiments, aspects of the present disclosure may additionally or alternatively be applied to an engine 10 having any other suitable configuration. For example, referring briefly to FIG. 1B, an engine in accordance with another embodiment is depicted. The exemplary engine 10 of FIG. 1B is configured in substantially the same manner as FIG. 1A, however, for the embodiment of FIG. 1B, the engine further includes an outer nacelle or duct 19. The outer nacelle 19 is supported by the vane assembly 20.

Figure 2:
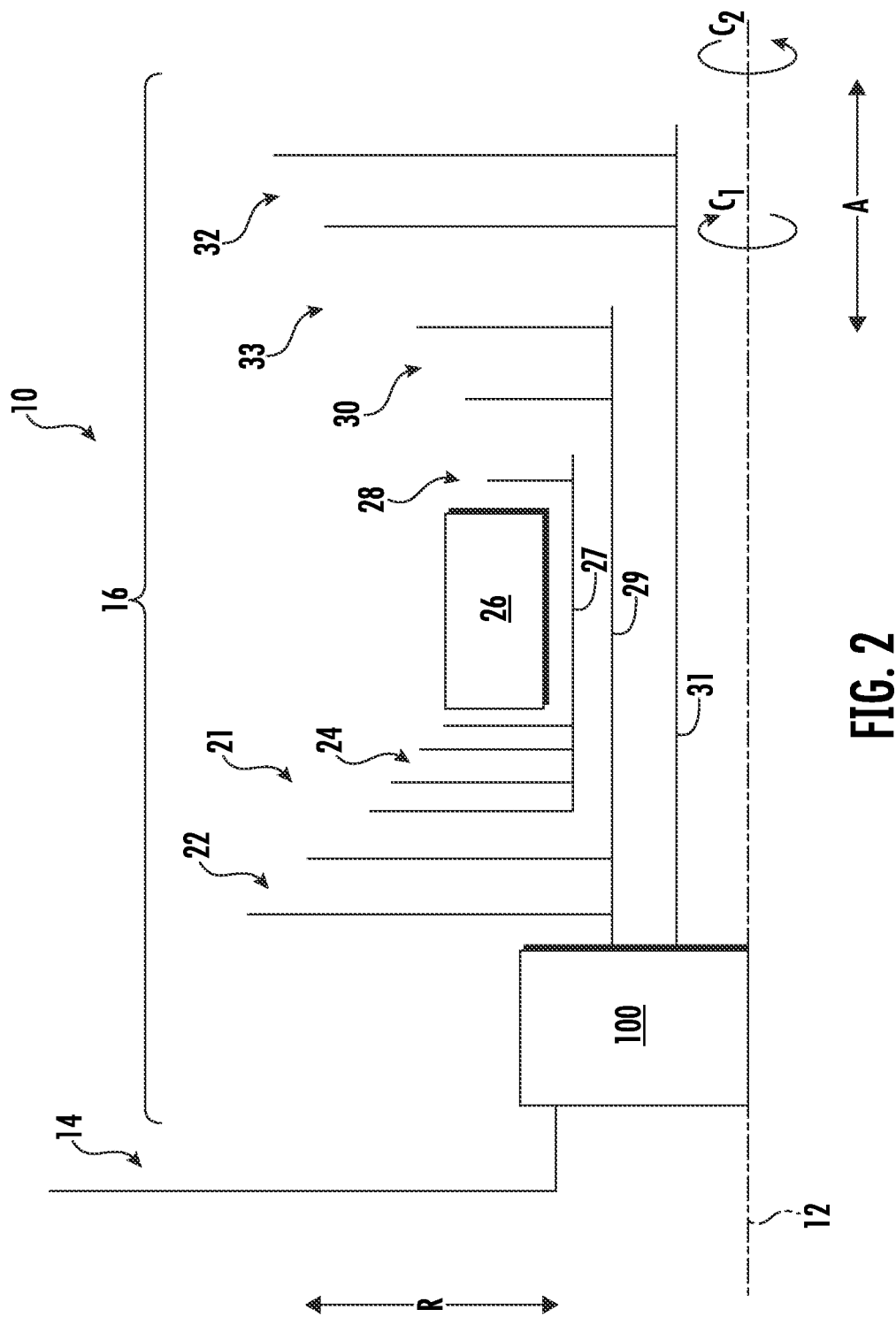
FIG. 2 is a schematic, side view of a gas turbine engine according to still another exemplary embodiment of the present disclosure.

Referring now to FIG. 2, a schematic view of an exemplary embodiment of an engine 10 in accordance with the present disclosure is provided. As with the embodiment of FIG. 1A, the engine 10 of FIG. 2 includes a fan assembly 14 and a turbomachine 16 and defines an axial direction A, an axial centerline 12 extending along the axial direction A, a radial direction R relative to the axial centerline 12, a first circumferential direction C1, and a second circumferential direction C2. The turbomachine 16 includes a compressor section 21, a combustion section 26, and a turbine section 33 together in serial flow arrangement. The turbomachine 16 further includes a high-speed spool that includes a high-speed compressor 24 and a high-speed turbine 28 operably rotatably coupled together by a high-speed shaft 27. The combustion section 26 is positioned between the high-speed compressor 24 and the high-speed turbine 28.

Referring still to FIG. 2, the turbomachine 16 further includes a booster or low-speed compressor 22 within the compressor section 21 coupled to a first turbine 30 within the turbine section 33 through a first shaft 29. The low-speed compressor 22 is positioned in flow relationship with the high-speed compressor 24 at a location upstream of the high-speed compressor 24. The first turbine 30 is positioned in flow relationship with the high-speed turbine 28 at a location downstream of the high-speed turbine 28.

Various embodiments of the turbine section 33 further include a second turbine 32 within the turbine section 33, rotatably coupled to a second shaft 31. The second turbine 32 is positioned in flow relationship with the first turbine 30 at a location downstream of the first turbine 30.

The engine 10 further includes a gear assembly 100 located forward of the combustion section 26 of the turbomachine 16. The first turbine 30 and the second turbine 32 are each operably connected to the gear assembly 100 to provide power to a power output component and fan assembly 14. In at least certain exemplary embodiments, the first turbine 30 may be configured to rotate in the first circumferential direction C1 and the second turbine 32 may be configured to rotate in a second circumferential direction C2.

More specifically, the gear assembly 100 is configured to transfer power from the turbine section 33 and reduce an output rotational speed at the fan assembly 14 relative to one or both turbines 30, 32. Embodiments of the gear assembly 100, as depicted and described below, may allow for gear ratios suitable for, e.g., large-diameter unducted fans (see, e.g., FIG. 1A) and relatively small-diameter and/or relatively high-speed turbines (see, e.g., FIG. 1B), such as turbines 30, 32. Additionally, embodiments of the gear assembly 100 provided herein may be suitable within the radial or diametrical constraints of the turbomachine 16 within the outer casing 18 at the location forward of the combustion section 26.

It will be appreciated that for a gear assembly having two inputs and one output, two gear ratios may be needed to fully describe the gearing of the gear assembly 100. In particular, the gear assembly 100 defines a maximum gear ratio and a minimum gear ratio. The maximum gear ratio may be measured as the ratio of a rotational speed quickest input (in RPM) to a rotational speed of the output (also in RPM). The minimum gear ratio may be measured as the ratio of a rotational speed slowest input (in RPM) to a rotational speed of the output (also in RPM). Gear ratio without a modifier refers to the maximum gear ratio.

Embodiments of the gear assembly 100 depicted and described herein may allow for maximum gear ratios of up to 14:1. Still other various embodiments of the gear assembly 100 provided herein may allow for maximum gear ratios of at least 3:1. Still other various embodiments of the gear assembly 100 provided herein allow for maximum gear ratios between 4:1 to 12:1 for a two-stage epicyclic gear assembly or compound gear assembly, such as the ones described below. The minimum gear ratio may be less than the maximum gear ratio, such as greater than about 1:1. For example, the minimum gear ratio may be 5% less than the maximum gear ratio, such as 10% less, 20% less, 30% less 40% less, less 50% less, less 60% less, less 70% less, less 80% less than the maximum gear ratio. The minimum gear ratio may be at least 7% of the maximum gear ratio, such as at least 10% of the maximum gear ratio, such as at least 15% of the maximum gear ratio, such as at least 25% of the maximum gear ratio, such as at least 35% of the maximum gear ratio, such as at least 50% of the maximum gear ratio.

It should be appreciated that embodiments of the gear assembly 100 provided herein may allow for large gear ratios such as provided herein between the turbine section 33 and the fan assembly 14, or particularly between a first turbine 30 and the fan assembly 14, between a second turbine 32 and the fan assembly 14, or both.

The engine of FIG. 2 may be an un-shrouded or open rotor engine, such as the one in FIG. 1A, or may be a ducted engine, such as the one in FIG. 1B. Additionally, it should be appreciated that aspects of the disclosure provided herein may be applied partially ducted engines, aft-fan engines, or other gas turbine engine configurations, including those for marine, industrial, or aero-propulsion systems. Certain aspects of the disclosure may be applicable to, e.g., turbofan, turboprop, or turboshaft engines. However, it should be appreciated that certain aspects of the disclosure may address issues that may be particular to un-shrouded or open rotor engines, such as, but not limited to, issues related to gear ratios, fan diameter, fan speed, or combinations thereof.

Moreover, it will be appreciated that in other exemplary embodiments, the turbomachine 16 may have any other suitable configuration. For example, referring now to FIG. 3, a schematic view of an exemplary embodiment of an engine 10 in accordance with another embodiment of the present disclosure is provided. The exemplary engine 10 of FIG. 3 is configured in substantially the same manner as exemplary turbomachine 16 of FIG. 2.

Figure 3:
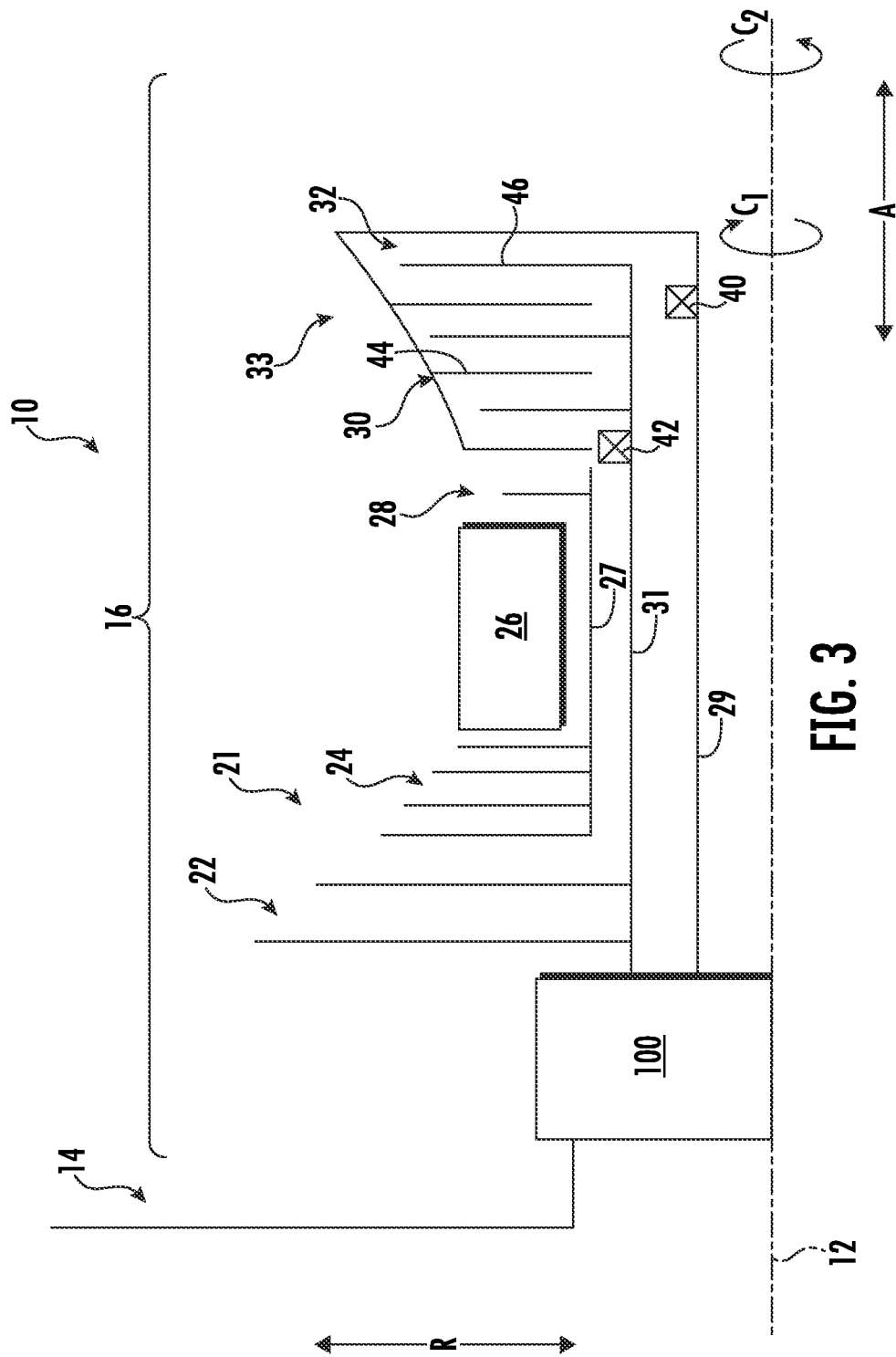
FIG. 3 is a schematic, side view of a gas turbine engine according to yet another exemplary embodiment of the present disclosure.

However, for the embodiment of FIG. 3, a turbomachine 16 of the engine 10 includes one or more interdigitated structures at the compressor section 21, at the turbine section 33, or both. Particularly for the embodiment depicted, a turbine section 33 includes a second turbine 32 interdigitated with a first turbine 30, such as via a rotating outer shroud, drum, casing, or rotor. Although not depicted, it should be appreciated that embodiments of the turbine section 33 may additionally include the first and/or second turbine 30, 32 interdigitated with one or more stages of the high-speed turbine 28.

More specifically, for the exemplary embodiment depicted, it will be appreciated that the first turbine 30 includes a first plurality of turbine rotor blades 44 and the second turbine 32 includes a second plurality of turbine rotor blades 46. The first turbine 30 and first plurality of turbine rotor blades 44 are configured to rotate in a first direction, and more specifically, in a first circumferential direction C1 relative to the axial centerline 12. The second turbine 32 and second plurality of turbine rotor blades 46 are configured to rotate in a second direction, and more specifically, in a second circumferential direction C2 relative to the axial centerline 12. The second circumferential direction is opposite the first circumferential direction. In such a manner, the first turbine 30 and the second turbine 32 may together be configured as a counterrotating turbine. Such a configuration may negate the need for one or more stages of stationary guide vanes between adjacent stages of turbine rotor blades, potentially resulting in a more axially compact and lighter engine 10.

In another embodiment, the compressor section 21 includes the low-speed compressor 22 interdigitated with the high-speed compressor 24.

Referring still to FIG. 3, it will be appreciated that the engine 10 includes a first turbine section bearing 40 supporting the first turbine 30 and shaft 29 at a location aft of the combustion section 26 and a second turbine section bearing 42 supporting the second turbine 32 and shaft 31 also at a location aft of the combustion section 26. As will be explained in more detail below, depending on how these shafts 29, 31 are supported within or forward of the compressor section 21, the turbine section bearings 40, 42 may be thrust bearings, or alternatively may be roller bearings or other non-thrust bearing.

Figure 4:
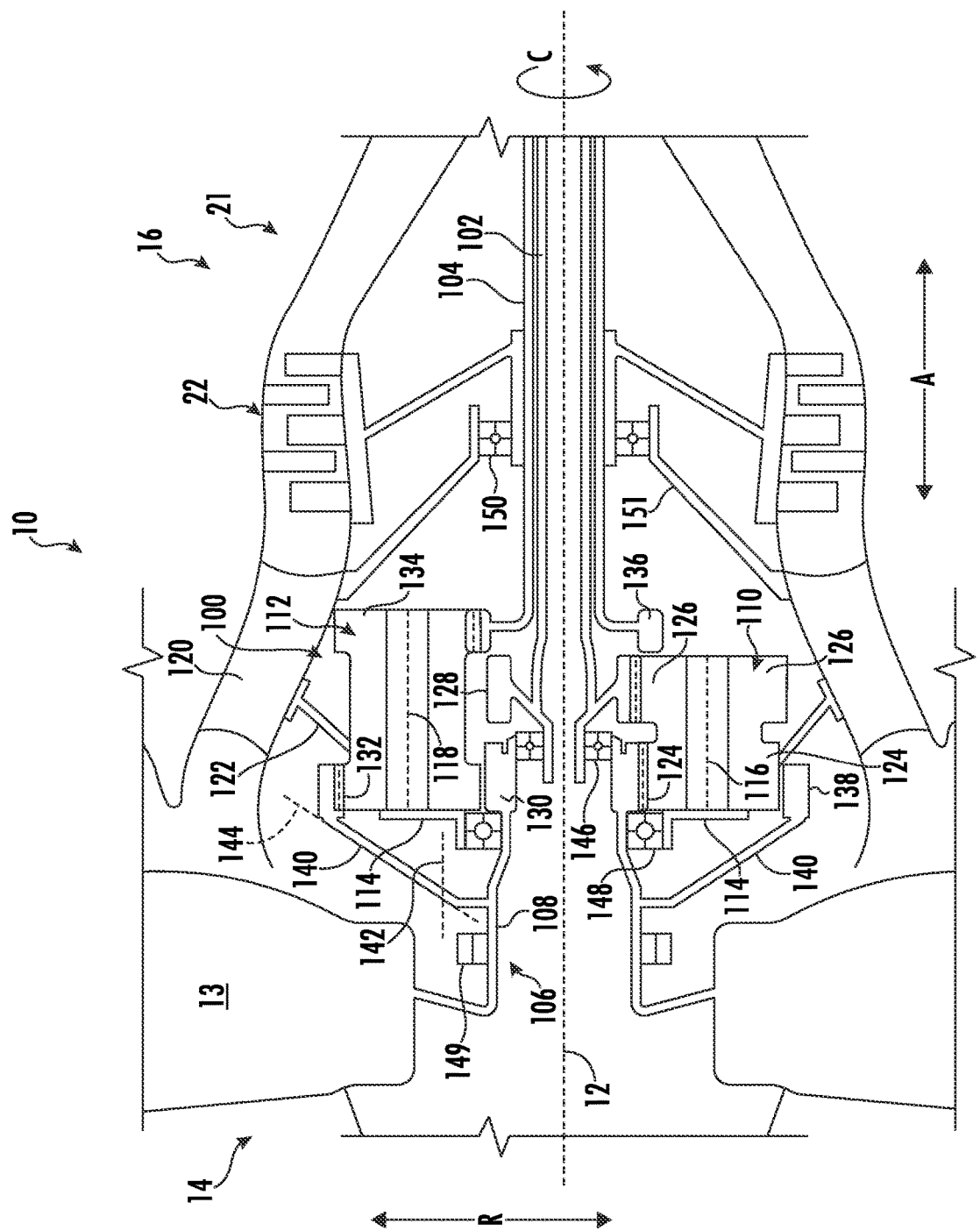
FIG. 4 is a close-up view of a turbomachine having a gear assembly according to an exemplary embodiment of the present disclosure.

Referring now to FIG. 4, a close-up, cross-sectional view is provided of a gas turbine engine 10 in accordance with another exemplary embodiment of the present disclosure. The exemplary gas turbine engine 10 of FIG. 4 may be configured in a similar manner as one or more of the exemplary gas turbine engines 10 described above with reference to FIGS. 1 through 3. In such a manner, it will be appreciated that the exemplary gas turbine engine 10 of FIG. 4 generally includes a fan assembly 14 having a plurality of fan blades 13 a turbomachine 16, a combustion section 26 (not shown; see FIGS. 2 and 3), and a turbine section 33 (not shown; see FIGS. 2 and 3) in serial flow order.

Moreover, the exemplary turbomachine 16 depicted in FIG. 4 additionally includes a first input power source 102 and a second input power source 104 configured to counterrotate relative to the first input power source 102. The first input power source 102 may be rotatable with one of the first turbine 30 or second turbine 32 in FIGS. 2 and 3, and the second input power source 104 may be rotatable with the other of the first turbine 30 or second turbine 32 in FIGS. 2 and 3. More specifically, for the exemplary embodiment of FIG. 4, the first input power source 102 is a low-speed input power source (e.g., corresponding to turbine 32 and shaft 31 in FIGS. 2 and 3) and the second input power source 104 is a high-speed input power source (corresponding to turbine 30 and shaft 29 in FIGS. 2 and 3).

Moreover, the exemplary turbomachine 16 of FIG. 4 additionally includes a power output component 106 operably connected to the fan assembly 14. More specifically, as will be described in more detail below, the power output component 106 includes a fan shaft 108 rotatable with the fan blades 13 for driving the plurality of fan blades 13.

Further, still, the exemplary turbomachine 16 of FIG. 4 additionally includes a gear assembly 100 located forward of the combustion section 26 of the turbomachine 16. More specifically, in the exemplary embodiment depicted, the gear assembly 100 is located forward of low-speed compressor 22 of the compressor section 21 of the turbomachine 16. The gear assembly 100 is configured to receive power from the first input power source 102 and the second input power source 104 and provide power to the power output component 106. In such a manner, it will be appreciated that the gear assembly 100 is configured to receive power from two separate power sources and to provide power to a single output (the power output component 106).

In the embodiment depicted, the gear assembly 100 generally includes a first planet gear 110 configured to operably connect the first input power source 102 to the power output component 106 and a second planet gear 112 configured to operably connect the second input power source 104 to the power output component 106.

It will be appreciated that although a single first planet gear 110 and a single second planet gear 112 are depicted in the cross-sectional view of FIG. 4, the gear assembly 100 may include a plurality of first planet gears 110 and a plurality of second planet gears 112. For example, the gear assembly 100 may include between two and six first planet gears 110 and between two and six second planet gears 112.

The first planet gear 110 and the second planet gear 112 are rotatably mounted to a planet gear carrier 114. For example, the first planet gear 110 defines a first planet gear axis 116 and the second planet gear 112 defines a second planet gear axis 118. The first planet gear 110 is configured to rotate circumferentially about the first planet gear axis 116 and the second planet gear 112 is configured to rotate circumferentially about the second planet gear axis 118.

As will be appreciated, the turbomachine 16 further includes a stationary, structural member 120, and the planet gear carrier 114 is mounted to the structural member 120. More specifically, the turbomachine 16 includes a planet gear mount 122 extending from the planet gear carrier 114 to the structural member 120. The planet gear mount 122 may extend between adjacent first and second planet gears 110, 112 in the circumferential direction C (see FIGS. 5 and 6, discussed below).

Figure 5:
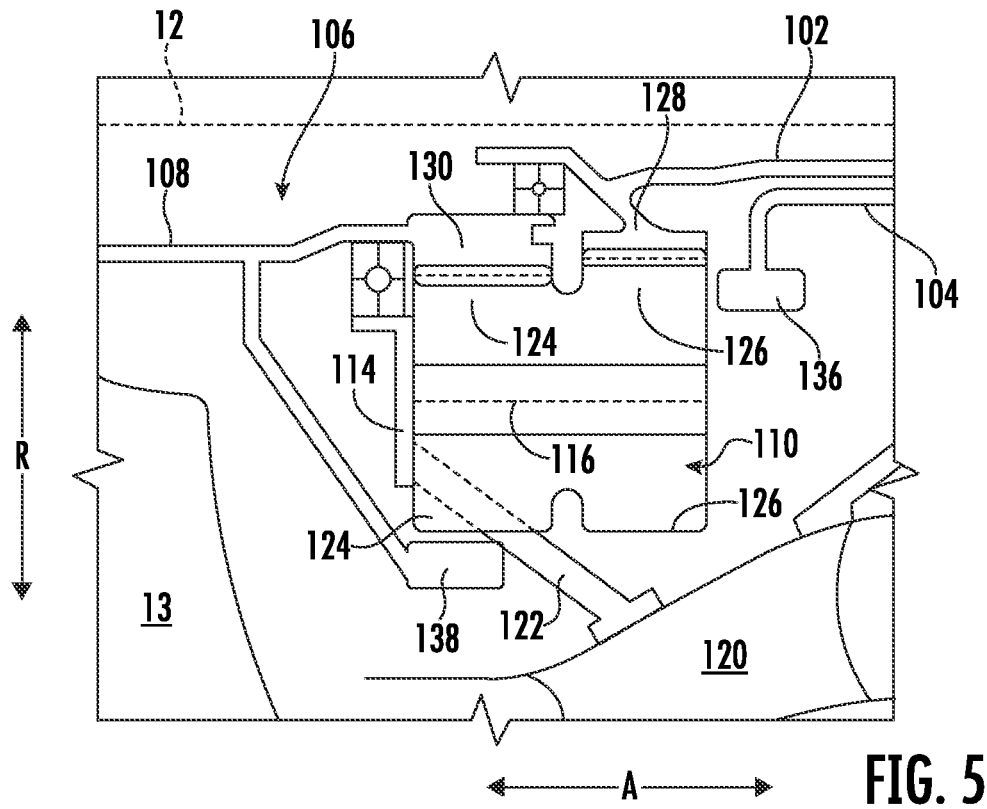
FIG. 5 is a close-up view of a first portion of the exemplary gear assembly of FIG. 4.

Referring briefly also to FIG. 5, providing a close-up view of the first planet gear 110 of the gear assembly 100, it will be appreciated that the first planet gear 110 generally includes a first forward gear 124 and a first aft gear 126. Further, the first input power source 102 includes a first sun gear 128, and the power output component 106 comprises an output sun gear 130. The first sun gear 128 of the first input power source 102 is configured to mesh with the first aft gear 126 of the first planet gear 110 and the first forward gear 124 of the first planet gear 110 is configured to mesh with the output sun gear 130 of the power output component 106. Throughout the FIGS., the meshing of two gears is generally indicated by a phantom line. In such a manner, the gear assembly 100 defines a first torque path from the first input power source 102, through the first planet gear 110, and to the power output component 106.

Figure 6:
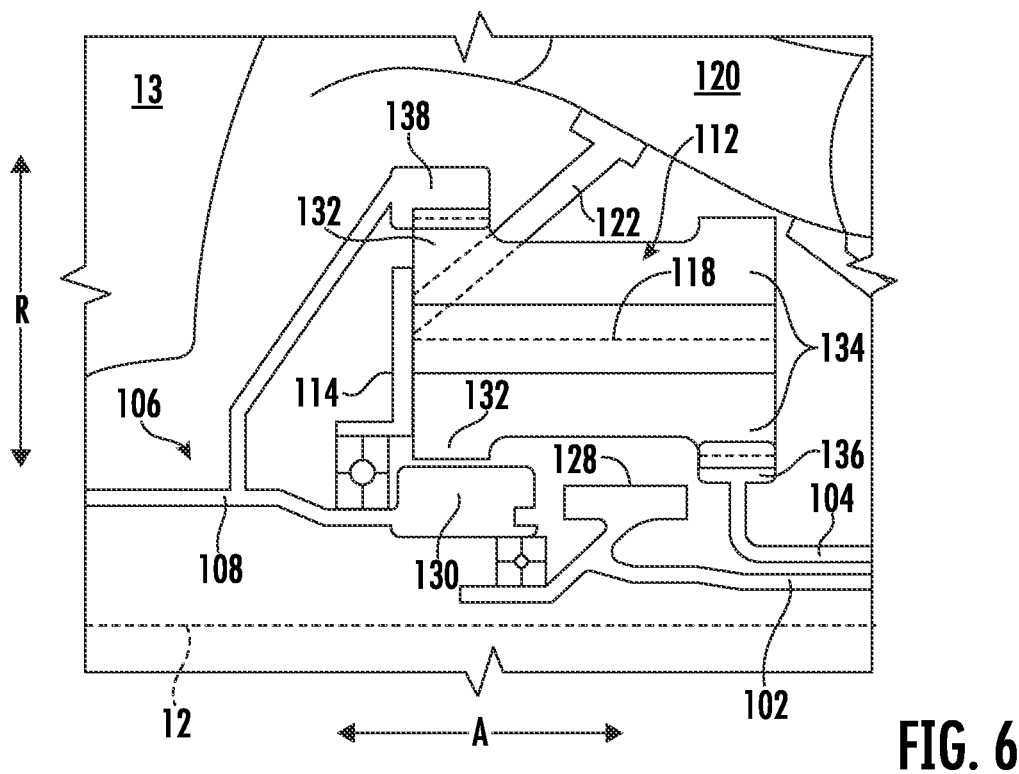
FIG. 6 is a close-up view of a second portion of the exemplary gear assembly of FIG. 4.

Referring back to FIG. 4 and briefly also to FIG. 6, providing a close-up view of the second planet gear 112 of the gear assembly 100, it will be appreciated that the second planet gear 112 generally includes a second forward gear 132 and a second aft gear 134. Further, the second input power source 104 includes a second sun gear 136, and the power output component 106 comprises a ring gear 138. The second sun gear 136 of the second input power source 104 is configured to mesh with the second aft gear 134 of the second planet gear 112 and the second forward gear 132 of the second planet gear 112 is configured to mesh with the ring gear 138 of the power output component 106. In such a manner, the gear assembly 100 additionally defines a second torque path from the second input power source 104, through the second planet gear 112, and to the power output component 106.

Notably, the first planet gear 110 is configured to rotate at a different rotational speed than the second input power source 104, or more specifically at a different rotational speed than of the second sun gear 136, and further at a different rotational speed than of the ring gear 138 of the power output component 106 (see, e.g., FIG. 5). Similarly, the second planet gear 112 is configured to rotate at a different rotational speed than of the first input power source 102, or more specifically at a different rotational speed than of the first sun gear 128, and further at a different rotational speed than of the output sun gear 130 of the power output component 106 (see, e.g., FIG. 6).

Referring back also to FIG. 4, it will be appreciated that the exemplary turbomachine 16 depicted in FIG. 4 is configured to transfer an axial load from the fan assembly 14 to the first input power source 102, the second input power source 104, or both during operation of the engine. For example, it will be appreciated that the fan assembly 14 may experience a relatively large axial load during operation as a result of an amount of thrust generated by a rotation of the plurality of fan blades 13 of the fan assembly 14. Further, as the first input power source 102 and the second input power source 104 are each coupled to a turbine of the turbine section 33 of the turbomachine 16, the first input power source 102 and the second input power source 104 may experience an axial load in a direction opposite along the axial direction A the axial load experienced by the fan assembly 14 during operation of the gas turbine engine 10. Accordingly, by transferring all or a portion of the axial load on the fan assembly 14 to the first input power source 102, the second input power source 104, or both, a smaller net axial load may need be borne by one or more thrust bearings, as described below.

In particular, for the exemplary embodiment of FIGS. 4 to 6, the gear assembly 100 includes at least one helical gear. For example, the first planet gear 110 may include the at least one helical gear. More specifically, for the embodiment depicted, the output sun gear 130 of the power output component 106, the first forward gear 124 of the first planet gear 110, the first aft gear 126 of the first planet gear 110, and the first sun gear 128 of the first input power source 102 are each configured as a helical gear.

More specifically, the gear assembly 100 includes at least one single helical gear. For example, the first planet gear 110 may include the at least one single helical gear. More specifically, for the embodiment depicted, the output sun gear 130 of the power output component 106, the first forward gear 124 of the first planet gear 110, the first aft gear 126 of the first planet gear 110, and the first sun gear 128 of the first input power source 102 are each configured as a single helical gear.

In such a manner, the gear assembly 100 may further define a first axial load path from the power output component 106, through the first planet gear 110, to the first input power source 102, similar to the first torque path.

It will be appreciated that as used herein, the term "helical gear" refers to a type of cylindrical gear with a slanted tooth trace inclined in one or more directions. The term "single helical gear" refers to a type of cylindrical gear with a slanted tooth trace inclined in one direction. For example, referring briefly to FIG. 7, a pair of exemplary single helical gears are depicted for reference. More specifically, FIG. 7 depicts a first single helical gear 202 and a second single helical gear 204 configured to mesh with the first single helical gear 202. The first single helical gear 202 includes a first plurality of teeth 206 circumferentially spaced and oriented in a first direction 208 relative to a first centerline 210 of the first single helical gear 202. The second single helical gear 204 includes a second plurality of teeth 212 circumferentially spaced and oriented in a second direction 214 relative to a second centerline 216 of the second single helical gear 204. The first direction 208 is opposite the second direction 214.

Figure 8:
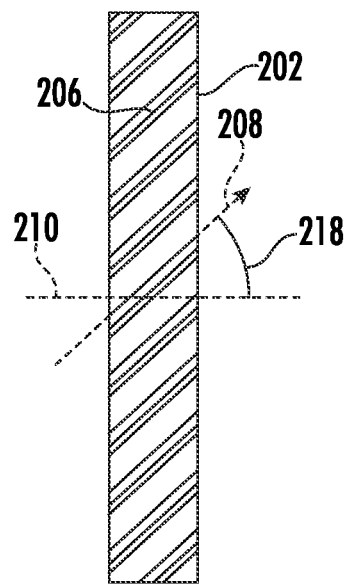
FIG. 8 is a plan view of a first of the pair of single helical gears of FIG. 7.

Moreover, referring now briefly to FIG. 8, providing a plan view of a side of the first single helical gear 202 and the first plurality of teeth 206, it will be appreciated that the first direction 208 of the first plurality of teeth 206 defines a helix angle 218 with the first centerline 210. Notably, the first plurality of teeth 206 each define a relatively straight shape. In other embodiments, however, the first plurality of teeth 206 may define a single curved shape, a multiple curved shape, etc. Nonetheless, the first direction 208 may refer to an imaginary line extending from a left-hand start of one tooth at an outer leading edge to a right-hand end of the same tooth at the outer leading edge. The second single helical gear 204 may define the same, but opposite, helix angle.

The helix angle 218 may be between about 10 degrees and about 60 degrees, such as between about 15 degrees and about 45 degrees.

Single helical gears generally allow for a larger contact ratio and provide a reduced vibration while being capable of transmitting a large force in a direction parallel to their centerlines.

Referring now back to FIGS. 4 through 6, it will be appreciated that for the embodiment depicted, the second planet gear 112 further includes at least one helical gear. In particular, for the embodiment of FIGS. 4 through 6, the ring gear 138 of the power output component 106, the second forward gear 132 of the second planet gear 112, the second aft gear 134 of the second planet gear 112, and the second sun gear 136 of the second input power source 104 are each also configured as a helical gear.

More specifically, it will be appreciated that for the embodiment depicted, the second planet gear 112 further includes at least one single helical gear. In particular, the ring gear 138 of the power output component 106, the second forward gear 132 of the second planet gear 112, the second aft gear 134 of the second planet gear 112, and the second sun gear 136 of the second input power source 104 are each also configured as a single helical gear.

In such a manner, the gear assembly 100 may further define a second axial load path from the power output component 106, through the second planet gear 112, to the second input power source 104, similar to the second torque path.

Notably, the power output component 106 further includes a shaft extension 140 extending between the fan shaft 108 and the ring gear 138. In order to facilitate a desired amount of load transfer of an axial load from the power output component 106 to the ring gear 138, the shaft extension 140 defines an extension angle 142 with the axial centerline 12 greater than or equal to about 15 degrees and less than or equal to about 90 degrees, such as greater than or equal to about 25 degrees and less than or equal to about 75 degrees. In certain embodiments, the extension angle 142 may be greater than or equal to about 30 degrees, such as greater than or equal to about 45 degrees, and less than or equal to about 60 degrees. The extension angle 142 may be defined between a reference line 144 extending along a majority of the shaft extension 140 in a plane defined by the radial direction R and the axial direction A (the plane depicted in FIG. 4), extending through the axial centerline 12.

Moreover, for the exemplary gas turbine engine 10 depicted in FIG. 4, the gas turbine engine 10 provides for an additional axial load path parallel to the first axial load path. More specifically, the gas turbine engine 10 further includes an inter-shaft bearing 146 position between the first input power source 102 and the power output component 106. In the embodiment shown, the inter-shaft bearing 146 is configured as a thrust bearing. In such a manner, it will be appreciated that the gas turbine engine 10 defines a third axial load path from the power output component 106, through the inter-shaft bearing 146, to the first input power source 102.

It will be appreciated that the third axial load path is arranged in parallel with the first axial load path. Accordingly, during operation of the gas turbine engine 10, a first portion of an axial load on the fan assembly 14 and power output component 106 may be configured to pass through the gear assembly 100 by way of the helical gear, and more specifically by way of the first planet gear 110, to the first input power source 102 (along the first axial load path), and a second portion of the axial load on the power output component 106 may be configured to pass through the inter-shaft bearing 146 to the first input power source 102 (along the third axial load path).

Briefly, it will further be appreciated that a third portion of the axial load on the power output component 106 may be configured to transfer to a structural member 120 through a first bearing 148 (each described below). Such portion of the axial load transferred to the structural member 120 may be a thrust load for the gas turbine engine 10.

For the embodiment shown, with the parallel axial load paths between the power output component 106 and the first input power source 102, an axial load required to be transferred across the inter-shaft bearing 146 may be sufficiently low facilitate a relatively small thrust bearing, such as the one depicted. Notably, the power output component 106 and the first input power source 102 may be configured to co-rotate (i.e., rotate in the same circumferential direction as one another). Further, with such a configuration, it will be appreciated that the inter-shaft bearing 146 may be located inward along the radial direction R of at least one gear of the gear assembly 100. Such may facilitate both a radially and axially compact gear assembly 100 for the gas turbine engine 10.

Notably, the inter-shaft bearing 146 is the primary thrust bearing for the first input power source 102. In such a manner, the inter-shaft bearing 146 may support all or substantially all axial loads on the first input power source 102. However, a separate bearing (a non-thrust bearing) may be provided at a location not depicted (e.g., aft of the combustion section 26) separately providing radial support for the first input power source 102.

As will also be appreciated from the exemplary embodiment of FIG. 4, the first input power source 102 and the second input power source 104 are configured to be axially grounded relative to a stationary structure of the gas turbine engine 10 at a location forward of the combustion section 26 of the turbomachine 16. More specifically, for the embodiment depicted, the gas turbine engine 10 includes the inter-shaft bearing 146 and a first thrust bearing 148 located forward of the combustion section 26 of the turbomachine 16 supporting the first input power source 102, and a second thrust bearing 150 also located forward of the combustion section 26 of the turbomachine 16 and supporting the second input power source 104.

More specifically, for the embodiment depicted the inter-shaft bearing 146 is the primary thrust bearing for the first input power source 102. The axial loads from the inter-shaft bearing 146, however, are grounded axially relative to a stationary structure of the gas turbine engine 10 by the first thrust bearing 148. The first thrust bearing 148 is configured as a carrier bearing position between the planet gear carrier 114 and the fan shaft 108 of the power output component 106. In such a manner, the first thrust bearing 148 may axially ground the power output component 106 and first input power source 102 at the gear assembly 100 or proximate to the gear assembly 100 (e.g., relative to the combustion section 26).

Briefly, it will further be appreciated that the carrier bearing is positioned at least partially forward of the second planet gear 112 and at least partially after the shaft extension 140. Such may facilitate a more axially compact gear assembly 100 for the gas turbine engine 10. Such a configuration is enable at least in part by the conical configuration of the shaft extension 140, defining the angle 142 with the axial centerline 12.

It will be appreciated that for the embodiment of FIG. 4, at least some of the axial load on the power output component 106 is transferred to a structure of the engine 10 through the first thrust bearing 148 and the second thrust bearing 150. For example, at least a portion of the second portion of the axial load on the power output component 106 that is transferred through the gear assembly 100, and more specifically through the second planet gear 112 to the second input power source 104, may be transferred to a structure of the engine 10 through the second thrust bearing 150. Such force may provide a propulsive thrust load for the gas turbine engine 10.

Notably, for the embodiment depicted, the gas turbine engine 10 further includes a non-thrust bearing 149 providing a radial support for the power output component 106 at a location separate from first thrust bearing 148. The location of non-thrust bearing 149 is by way of example only, and in other embodiments may be positioned at any other suitable location.

Further, for the embodiment depicted, the second thrust bearing 150 is similarly located at or proximate to the gear assembly 100 (relative to, e.g., the combustion section 26). The second thrust bearing 150 further extends to the structural member 120 of the gas turbine engine 10 through bearing support arm 151. The second thrust bearing 150 is the primary thrust bearing for the second input power source 104. In such a manner, the second thrust bearing 150 may support all or substantially all axial loads on the second input power source 104. However, a separate bearing (a non-thrust bearing) may be provided at a location not depicted (e.g., aft of the combustion section 26) separately providing radial support for the second input power source 104.

Notably, by axially grounding both the first input power source 102 and the second input power source 104 at or proximate to the gear assembly 100, forward of the combustion section 26 of the turbomachine 16, an amount of thermal expansion experienced by the first input power source 102 over a length of the first power source between the first thrust bearing 148 and, e.g., a first plurality of turbine rotor blades 44 rotatable with the first input power source 102, will be substantially matched by an amount of thermal expansion experienced by the second input power source 104 over a length of the second input power source 104 between the second thrust bearing 150 and, e.g., a second plurality of turbine rotor blades 46 rotatable with the second input power source 104. In such a manner, the thrust bearings 146, 148, 150 may ensure axial clearances are maintained within the turbine section 33, particularly when the turbine section 33 includes a counterrotating turbine assembly (see, e.g., FIG. 3). Further, positioning the thrust bearings 146, 148, 150 forward of the combustion section 26 may result in a less harsh environment for the thrust bearings 146, 148, 150.

Figure 9:
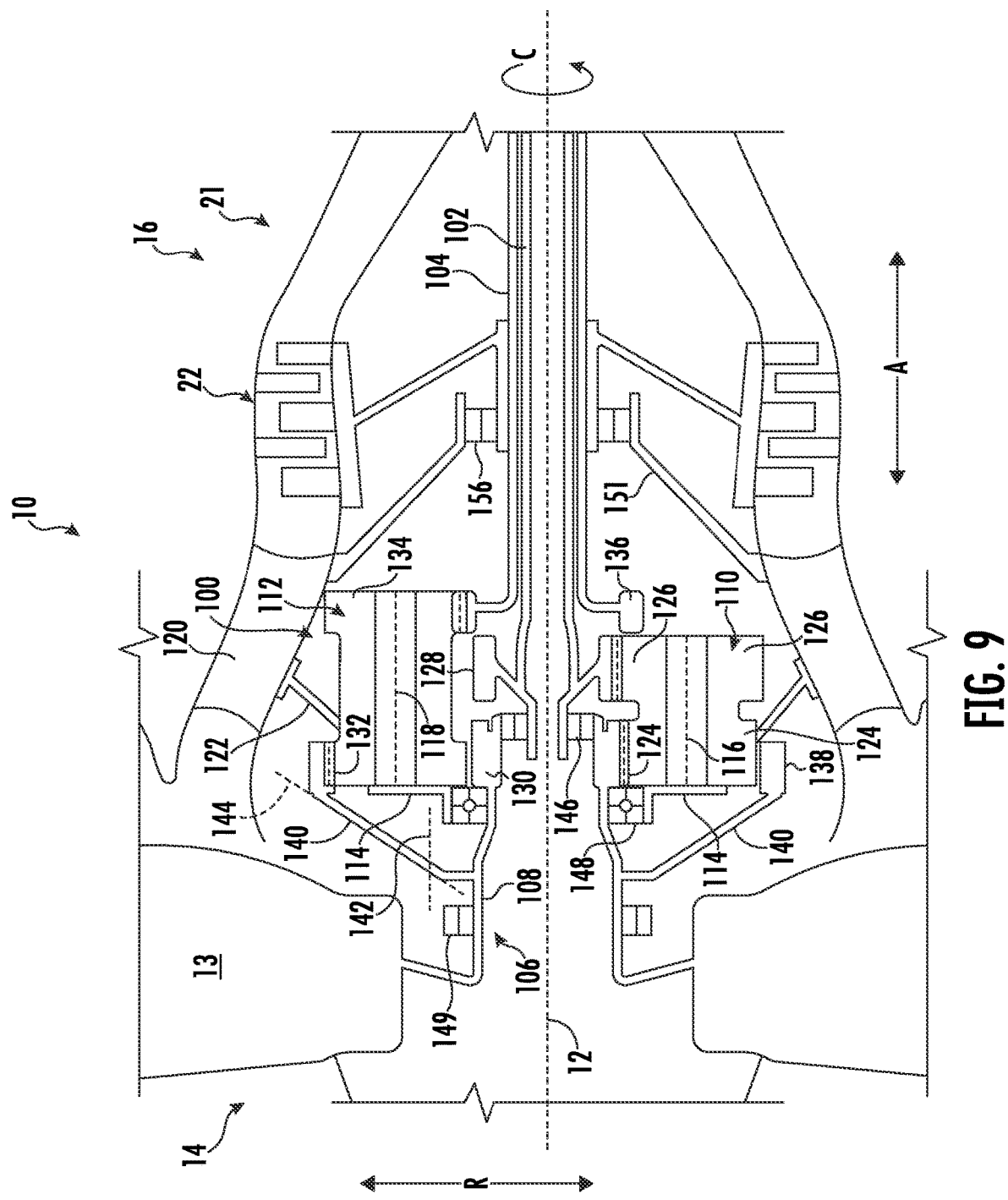
FIG. 9 is a close-up view of a turbomachine having a gear assembly according to another exemplary embodiment of the present disclosure.

It will be appreciated, however, that the exemplary gas turbine engine 10 described above with reference to FIG. 4 is provided by way of example only. In other exemplary embodiments, the gas turbine engine 10 may have any other suitable configuration. For example, an alternative exemplary embodiment is depicted in FIG. 9. FIG. 9 provides a cross-sectional view of a gas turbine engine 10 in accordance with another exemplary embodiment of the present disclosure. The exemplary gas turbine engine 10 of FIG. 9 may be configured in substantially the same manner as exemplary gas turbine engine 10 of FIG. 4. For example, the exemplary gas turbine engine 10 of FIG. 9 may generally include a fan assembly 14 and a turbomachine 16, with the turbomachine 16 including a first input power source 102, a second input power source 104, a power output component 106, and a gear assembly 100. The gear assembly 100 may similarly include a first planet gear 110 and a second planet gear 112, defining a first torque path from the first input power source 102 through the first planet gear 110 to the power output component 106, and a second torque path from the second input power source 104 through the second planet gear 112 to the power output component 106.

Moreover, for the exemplary embodiment depicted, the gas turbine engine 10 includes a plurality of bearings supporting rotation of these various components. In particular, the example gas turbine engine 10 of FIG. 9 generally includes an inter-shaft bearing 146 positioned between the first input power source 102 and the power output component 106, a first bearing 148 supporting a planet gear carrier 114 (to which the first planet gear 110 and the second planet gear 112 are rotatably mounted), and a second bearing 156 supporting rotation of the second input power source 104. However, for the exemplary embodiment depicted, one or more of these bearings 146, 152, 156 are configured as non-thrust bearings. More specifically, for the embodiment depicted, the inter-shaft bearing 146 and second bearing 156 are instead configured as radial support bearings providing minimal or no axial support. For example, these bearings 146, 156 may be configured as roller bearings.

It will be appreciated that with such a configuration, the gas turbine engine 10 may include a first thrust bearing supporting rotation of the first input power source 102 at a location aft of the combustion section 26 and a second thrust bearing supporting rotation of the second input power source 104 also at a location aft of the combustion section 26. For example, the first and second thrust bearings may be positioned in a similar manner as bearings 40, 42 in FIG. 3.

In such a manner, it will be appreciated that an axial load on the fan assembly 14 and power output component 106 may not be transferred from the power output component 106 to the first input power source 102 through the inter-shaft bearing 146 and the first bearing 148 (a carrier bearing). Nonetheless, the exemplary gear assembly 100 may still be configured to transfer an axial load from the fan assembly 14 and power output component 106 to the first input power source 102, the second input power source 104, or both through the gear assembly 100. More specifically, as with the embodiment described above with respect to FIG. 4, the first planet gear 110, a first sun gear 128 of the first input power source 102, and an output ring gear 138 of the power output component 106 may be configured as a helical gear, such as a single helical gear. In such a manner, the gear assembly 100 may define a first axial load path from the power output component 106 to the first input power source 102 through the first planet gear 110. Similarly, the second planet gear 112, a second ring gear 138 of the second input power source 104, and a ring gear 138 of the power output component 106 may each also be configured as a helical gear, such as a single helical gear. In such a manner, the gear assembly 100 may further define a second axial load path from the power output component 106 to the second input power source 104 through the second planet gear 112.

Figure 10:
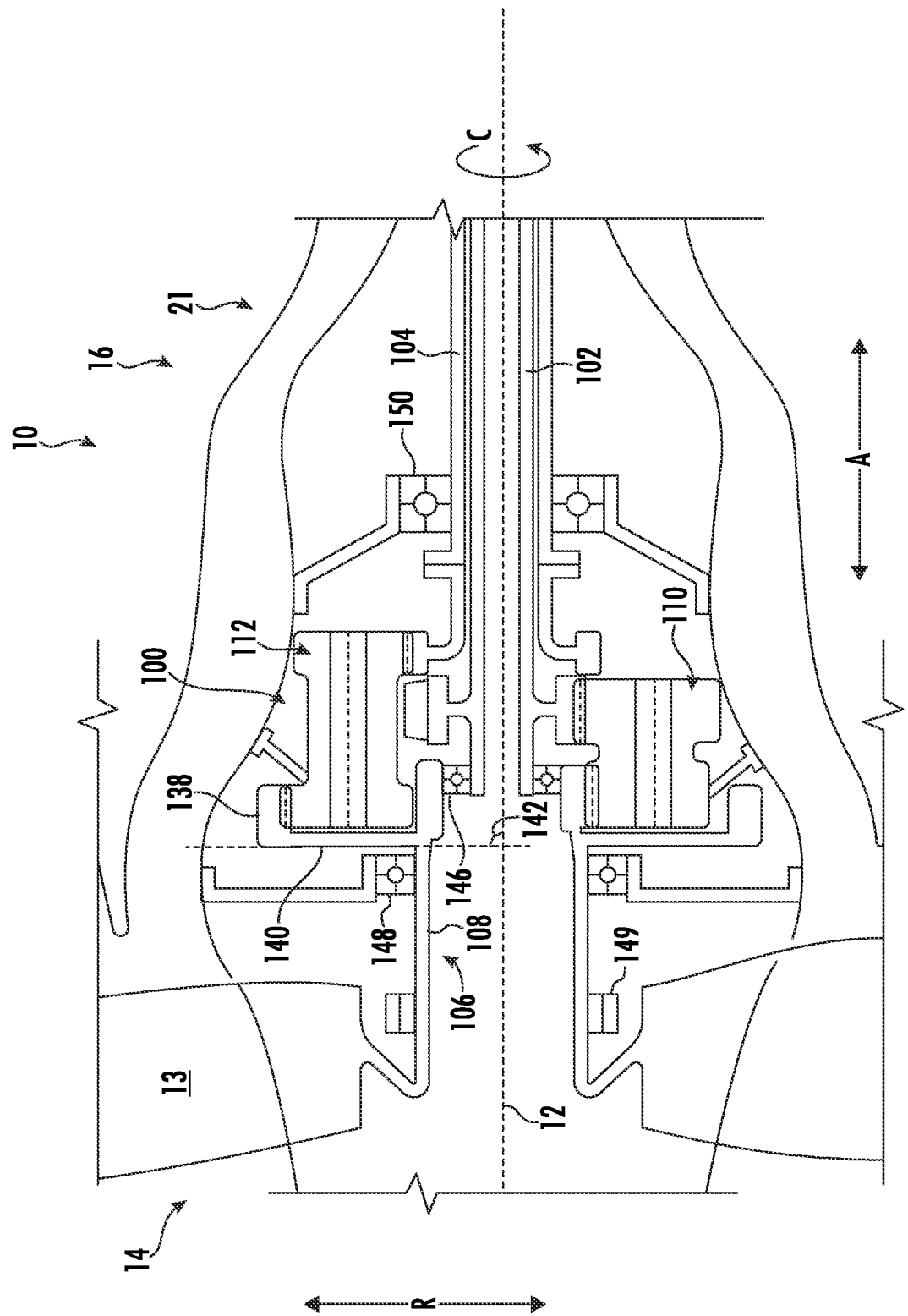
FIG. 10 is a close-up view of a turbomachine having a gear assembly according to yet another exemplary embodiment of the present disclosure.

It will further be appreciated that in still other exemplary embodiments, a gas turbine engine 10 in accordance with an exemplary aspect of the present disclosure may still be configured in other manners. For example, another alternative exemplary embodiment of the present disclosure is depicted in FIG. 10. FIG. 10 provides a cross-sectional view of a gas turbine engine 10 in accordance with another exemplary embodiment of the present disclosure. The exemplary gas turbine engine 10 of FIG. 10 may be configured in substantially the same manner as exemplary gas turbine engine 10 of FIG. 4.

For example, the exemplary gas turbine engine 10 of FIG. 10 may generally include a fan assembly 14 and a turbomachine 16, with the turbomachine 16 including a first input power source 102, a second input power source 104, power output component 106, and a gear assembly 100. The gear assembly 100 may similarly include the first planet gear 110 and the second planet gear 112, defining a first torque path from the first input power source 102 through the first planet gear 110 to the power output component 106, and a second torque path from the second input power source 104 through the second planet gear 112 to the power output component 106.

Moreover, for the exemplary embodiment depicted, the gas turbine engine 10 includes a plurality of bearings supporting rotation of these various components. In particular, the example gas turbine engine 10 of FIG. 10 generally includes an inter-shaft bearing 146 positioned between the first input power source 102 and the power output component 106 and a second thrust bearing 150 supporting rotation of the second input power source 104. Further, for the embodiment of FIG. 10, the gas turbine engine 10 further includes a first thrust bearing 148 supporting the power output component 106. As with the embodiment of FIG. 4, the inter-shaft bearing 146 in the second thrust bearing 150 are each configured as a thrust bearing to support axial loads on such components, and similarly, the first thrust bearing 148 is configured as a thrust bearing. In such manner, it will be appreciated that an axial load on the fan assembly 14 and power output component 106 may be transferred from the power output component 106 through the inter-shaft bearing 146 and to the first input power source 102. Further, with such a configuration, it will be appreciated that both the first input power source 102 and second input power source 104 are grounded along the axial direction at a location forward of the combustion section 26 of the turbomachine 16, and more specifically proximate the gear assembly 100. As discussed above, such may provide for desired maintenance of axial clearance, e.g., in a counterrotating turbine, while also allowing for mounting the bearings in a less harsh environment.

However, for the exemplary embodiment depicted, the turbomachine 16 is not configured to provide for an axial load path through the first planet gear 110, the second planet gear 112, or both. More specifically, as noted above, the gear assembly 100 defines a first torque path extending from the power output component 106 through the first planet gear 110 to the first input power source 102. The gear assembly 100 further defines a second torque path extending from the power output component 106, through the second planet gear 112, to the second input power source 104. For the embodiment shown, the gear assembly 100 includes at least one spur gear in the first torque path, includes at least one spur gear in the second torque path, or both. More specifically, for the embodiment shown, the gear assembly 100 includes only spur gears transferring torque in the first torque path and only spur gears transferring torque in the second torque path. In such a manner, the gear assembly 100 is not configured to provide a transfer of axial loads through the first torque path or through the second torque path.

It will be appreciated that as used herein, the term "spur gear" refers to a type of cylindrical gear wherein an edge of each tooth is straight and aligned parallel to a centerline of the gear (i.e., axis of rotation). For example, referring briefly to FIG. 11, a pair of exemplary spur gears are depicted for reference. More specifically, FIG. 11 depicts a first spur gear 220 and a second spur gear 222 configured to mesh with the first spur gear 220. The first spur gear 220 includes a first plurality of teeth 224 circumferentially spaced and oriented in a first direction 226 relative to a first centerline 228 of the first spur gear 220. The second spur gear 222 includes a second plurality of teeth 230 circumferentially spaced and oriented in a second direction 232 relative to a second centerline 234 of the second spur gear 222. The first direction 226 is aligned parallel with the first centerline 228 and the second direction 232 is aligned parallel with the second centerline 234. For example, referring now briefly also to FIG. 12, providing a plan view of a side of the first spur gear 220 and the first plurality of teeth 224, it will be appreciated that the first direction 226 of the first plurality of teeth 224 is aligned parallel with the first centerline 228, such that an angle between the first direction 226 and the first centerline 228 is 0 degrees or a de minimus angle (e.g., less than about 5 degrees). The second spur gear 222 may define the same angle. Spur gears generally allow for transmission of torque within transmitting force in a direction parallel to their centerlines.

Referring back to FIG. 10, it will be appreciated that the power output component 106 further includes a ring gear 138 configured to mesh with the second planet gear 112, a fan shaft 108, and a shaft extension 140 extending from the fan shaft 108 to the ring gear 138. In the embodiment shown, little or no axial load is transferred from the fan shaft 108 to the ring gear 138 through the shaft extension 140. As such, it will be appreciated that the exemplary shaft extension 140 depicted defines an extension angle 142 with the axial centerline 12 greater than or equal to about 80 degrees and less than or equal to about 95 degrees. Such a configuration may facilitate a more axially compact gear assembly 100.

Notably, however, in other embodiments, the gear assembly 100 of FIG. 10 may include at least one helical gear (or all helical gears) in the first torque path or the second torque path. When the gear assembly 100 includes helical gears in the second torque path, however, the shaft extension 140 may need to be modified to transfer anticipated axial loads.

It will be appreciated that the embodiments described herein above are my way of example only. In other exemplary embodiments, any other suitable configurations may be provided. For example, although at least certain of the embodiment discussed utilize single helical gear(s), other exemplary aspects may utilize a double helical gear(s) or other suitable helical gears.

The written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a fan assembly comprising a plurality of fan blades; and a turbomachine comprising a compressor section, a combustion section, and a turbine section in serial flow order, the turbomachine comprising a first input power source; a second input power source configured to counter-rotate relative to the first input power source; a power output component operably connected to the fan assembly; and a gear assembly located forward of the combustion section of the turbomachine, the gear assembly configured to receive power from the first input power source and the second input power source and provide power to the power output component, the gear assembly comprising a helical gear.

The gas turbine engine of one or more of these clauses, wherein the gear assembly includes a first planet gear configured to operably connect the first input power source to the power output component.

The gas turbine engine of one or more of these clauses, wherein the first planet gear comprises the helical gear, wherein the power output component comprises an output sun gear, and wherein the helical gear is configured to mesh with the output sun gear.

The gas turbine engine of one or more of these clauses, wherein the helical gear is a forward gear of the first planet gear, wherein the first planet gear further comprises an aft gear, wherein the first input power source comprises a first sun gear, wherein the aft gear of the first planet gear is configured to mesh with the first sun gear of the first input power source, and wherein the aft gear of the first planet gear and the first sun gear are each configured as a helical gear.

The gas turbine engine of one or more of these clauses, wherein the gear assembly further comprises a second planet gear, wherein the second planet gear is configured to operably connect the second input power source to the power output component.

The gas turbine engine of one or more of these clauses, wherein the second planet gear comprises a forward gear and an aft gear, wherein the second input power source comprises a second sun gear, wherein the power output component comprises a ring gear, wherein the forward gear of the second planet gear is configured to mesh with the ring gear, and wherein the aft gear of the second planet gear is configured to mesh with the second sun gear.

The gas turbine engine of one or more of these clauses, wherein the forward and aft gears of the second planet gear, the ring gear, and the second sun gear are each configured as a helical gear.

The gas turbine engine of one or more of these clauses, wherein the gas turbine engine defines an axial centerline, wherein the power output component comprises a fan shaft and a shaft extension, wherein the shaft extension extends between the fan shaft and the ring gear, wherein the shaft extension defines an angle with the axial centerline greater than or equal to about 15 degrees and less than or equal to about 90 degrees.

The gas turbine engine of one or more of these clauses, further comprising: a structural member, wherein the gear assembly further comprises a planet gear carrier, wherein the first planet gear and the second planet gear are each mounted to the planet gear carrier, and wherein the planet gear carrier is mounted to the structural member.

The gas turbine engine of one or more of these clauses, further comprising: a carrier bearing positioned between the planet gear carrier and the power output component, wherein the carrier bearing is a thrust bearing.

The gas turbine engine of one or more of these clauses, wherein the power output component comprises a ring gear operably connected to the second planet gear, a fan shaft, and a shaft extension, wherein the shaft extension extends between the fan shaft and the ring gear, and wherein the carrier bearing is positioned at least partially forward of the second planet gear and at least partially aft of the shaft extension.

The gas turbine engine of one or more of these clauses, wherein the helical gear is a single helical gear.

The gas turbine engine of one or more of these clauses, wherein the turbine section comprises a counterrotating turbine having a first plurality of turbine rotor blades configured to rotate a first direction and a second plurality of turbine rotor blades configured to rotate in a second direction opposite the first direction, wherein the first input power source is rotatable with the first plurality of turbine rotor blades, and wherein the second input power source is rotatable with the second plurality of turbine rotor blades.

The gas turbine engine of one or more of these clauses, wherein the first input power source is a low speed input power source, and wherein the second input power source is a high speed input power source.

The gas turbine engine of one or more of these clauses, further comprising: an inter-shaft bearing positioned between the first input power source and the power output component.

The gas turbine engine of one or more of these clauses, wherein the inter-shaft bearing is a thrust bearing.

The gas turbine engine of one or more of these clauses, wherein the inter-shaft bearing is configured as a thrust bearing such that a first portion of an axial load on the power output component is configured to pass through the inter-shaft bearing to the first input power source and a second portion of the axial load on the power output component is configured to pass through the gear assembly by way of the helical gear to the first input power source.

The gas turbine engine of one or more of these clauses, wherein a third portion of the axial load on the power output component is transferred to a structural member through a carrier bearing.

The gas turbine engine of one or more of these clauses, wherein a second thrust bearing located forward of the combustion section of the turbomachine and supporting the second input power source.

The gas turbine engine of one or more of these clauses, wherein the inter-shaft bearing is a roller bearing.

The gas turbine engine of one or more of these clauses, further comprising: a first thrust bearing located aft of the combustion section of the turbomachine and supporting the first input power source; and a second thrust bearing located aft of the combustion section of the turbomachine and supporting the second input power source.

The gas turbine engine of one or more of these clauses, wherein the gear assembly includes a first planet gear configured to operably connect the first input power source to the power output component and a second planet gear configured to operably connect the second input power source to the power output component, wherein the first planet gear comprises a first forward gear configured as the helical gear and a first aft gear, and wherein the second planet gear comprises a second forward gear and a second aft gear, wherein the first aft gear, the second forward gear, and the second aft gear are each configured as a helical gear.

A gear assembly for a gas turbine engine, the gas turbine engine comprising a fan assembly and a turbomachine, the turbomachine comprising a combustion section, a first input power source, a second input power source configured to counter-rotate relative to the first input power source, and a power output component operably connected to the fan assembly, the gear assembly comprising: a plurality of gears configured to be located forward of the combustion section of the turbomachine as installed in the turbomachine, the gear assembly configured to receive power from the first input power source and the second input power source and provide power to the power output component, the gear assembly comprising a helical gear.

A gas turbine engine comprising: a fan assembly comprising a plurality of fan blades; and a turbomachine comprising a compressor section, a combustion section, and a turbine section in serial flow order, the turbomachine comprising a first input power source; a second input power source configured to counter-rotate relative to the first input power source; a power output component operably connected to the fan assembly; a gear assembly located forward of the combustion section of the turbomachine, the gear assembly configured to receive power from the first input power source and the second input power source and provide power to the power output component; and an inter-shaft bearing positioned between the first input power source and the power output component.

The gas turbine engine of one or more of these clauses, wherein the inter-shaft bearing is configured as a thrust bearing.

The gas turbine engine of one or more of these clauses, wherein the gear assembly defines a torque path from the first input power source to the power output component, and wherein the gear assembly comprises at least one single helical gear in the torque path.

The gas turbine engine of one or more of these clauses, wherein a first portion of an axial load on the power output component is configured to pass through the inter-shaft bearing to the first input power source and a second portion of the axial load on the power output component is configured to pass through the gear assembly by way of the single helical gear to the first input power source.

The gas turbine engine of one or more of these clauses, wherein the gear assembly includes a first planet gear configured to operably connect the first input power source to the power output component and a planet gear carrier, when the first planet gear is coupled to the planet gear carrier, and wherein the gas turbine engine further comprises: a carrier bearing position between the planet gear carrier and the power output component, wherein the carrier bearing is a thrust bearing.

The gas turbine engine of one or more of these clauses, further comprising: a second thrust bearing located forward of the combustion section of the turbomachine and supporting the second input power source.

The gas turbine engine of one or more of these clauses, wherein the gear assembly defines a torque path from the first input power source to the power output component, and wherein the gear assembly comprises a plurality of spur gears in the torque path.

The gas turbine engine of one or more of these clauses, wherein the inter-shaft bearing is located inward along a radial direction of at least one gear of the gear assembly.

The gas turbine engine of one or more of these clauses, wherein the inter-shaft bearing is a roller bearing.

The gas turbine engine of one or more of these clauses, wherein the gear assembly comprises a plurality of spur gears.

The gas turbine engine of one or more of these clauses, wherein the turbine section comprises a counterrotating turbine having a first plurality of turbine rotor blades configured to rotate a first direction and a second plurality of turbine rotor blades configured to rotate in a second direction, wherein the first input power source is coupled to the first plurality of turbine rotor blades, and wherein the second input power source is coupled to the second plurality of turbine rotor blades.

The gas turbine engine of one or more of these clauses, wherein the gear assembly includes a first planet gear and a second planet gear, wherein the gas turbine engine defines an axial centerline, wherein the power output component comprises a fan shaft, a shaft extension, and a ring gear, wherein the shaft extension extends between the fan shaft and the ring gear, wherein the shaft extension defines an angle with the axial centerline greater than or equal to about 15 degrees and less than or equal to about 90 degrees.

The gas turbine engine of one or more of these clauses, wherein the gear assembly includes a first planet gear and a second planet gear, wherein the gas turbine engine defines an axial centerline, wherein the power output component comprises a fan shaft, a shaft extension, and a ring gear, wherein the shaft extension extends between the fan shaft and the ring gear, wherein the shaft extension defines an angle with the axial centerline greater than or equal to about 80 degrees and less than or equal to about 95 degrees.

The gas turbine engine of one or more of these clauses, wherein the inter-shaft bearing is configured as a roller bearing, wherein the gear assembly defines a torque path from the first input power source to the power output component, and wherein the gear assembly comprises at least one single helical gear in the torque path.

The gas turbine engine of one or more of these clauses, further comprising: a first thrust bearing located aft of the combustion section of the turbomachine and supporting the first input power source; and a second thrust bearing aft forward of the combustion section of the turbomachine and supporting the second input power source.

An assembly for a gas turbine engine, the gas turbine engine comprising a fan assembly and a turbomachine, the turbomachine comprising a combustion section, a first input power source, a second input power source configured to counter-rotate relative to the first input power source, and a power output component operably connected to the fan assembly, the assembly comprising: a gear assembly comprising a plurality of gears configured to be located forward of the combustion section of the turbomachine when installed in the turbomachine, the gear assembly configured to receive power from the first input power source and the second input power source and provide power to the power output component, and an inter-shaft bearing positioned between the first input power source and the power output component.

The assembly of one or more of these clauses, wherein the inter-shaft bearing is configured as a thrust bearing.

The assembly of one or more of these clauses, wherein the gear assembly defines a torque path from the first input power source to the power output component, and wherein the gear assembly comprises at least one single helical gear in the torque path.

The assembly of one or more of these clauses, wherein a first portion of an axial load on the power output component is configured to pass through the inter-shaft bearing to the first input power source and a second portion of the axial load on the power output component is configured to pass through the gear assembly by way of a single helical gear to the first input power source.

A gas turbine engine comprising: a fan assembly comprising a plurality of fan blades; and a turbomachine comprising a compressor section, a combustion section, and a turbine section in serial flow order, the turbomachine comprising a first input power source; a second input power source configured to counter-rotate relative to the first input power source; a power output component operably connected to the fan assembly; a gear assembly located forward of the combustion section of the turbomachine, the gear assembly configured to receive power from the first input power source and the second input power source and provide power to the power output component; a first thrust bearing located forward of the combustion section of the turbomachine and supporting the first input power source; and a second thrust bearing located forward of the combustion section of the turbomachine and supporting the second input power source.

The gas turbine engine of one or more of these clauses, wherein the first thrust bearing is an inter-shaft bearing position between the first input power source and the power output component.

The gas turbine engine of one or more of these clauses, wherein the first input power source is a low speed input power source, and wherein the second input power source is a high speed input power source.

The gas turbine engine of one or more of these clauses, wherein the turbine section comprises a counterrotating turbine having a first plurality of turbine rotor blades configured to rotate a first direction and a second plurality of turbine rotor blades configured to rotate in a second direction, wherein the first input power source is coupled to the first plurality of turbine rotor blades, and wherein the second input power source is coupled to the second plurality of turbine rotor blades.

The gas turbine engine of one or more of these clauses, wherein the gear assembly defines a torque path from the first input power source to the power output component, and wherein the gear assembly comprises at least one single helical gear in the torque path.

The gas turbine engine of one or more of these clauses, wherein the first thrust bearing is an inter-shaft bearing, wherein a first portion of an axial load on the power output component is configured to pass through an inter-shaft bearing to the first input power source and a second portion of the axial load on the power output component is configured to pass through the gear assembly by way of the single helical gear to the first input power source.

The gas turbine engine of one or more of these clauses, wherein the gear assembly includes a first planet gear configured to operably connect the first input power source to the power output component and a planet gear carrier, when the first planet gear is coupled to the planet gear carrier, and wherein the gas turbine engine further comprises: a carrier bearing position between the planet gear carrier and the power output component, wherein the carrier bearing is a thrust bearing.

The gas turbine engine of one or more of these clauses, wherein the gear assembly defines a torque path from the first input power source to the power output component, and wherein the gear assembly comprises at least one spur gear in the torque path.

The gas turbine engine of one or more of these clauses, wherein the first thrust bearing is an inter-shaft bearing, wherein substantially all of an axial load on the power output component is configured to pass through the inter-shaft bearing to the first input power source.

The gas turbine engine of one or more of these clauses, wherein the gear assembly defines a torque path from the second input power source to the power output component, and wherein the gear assembly comprises at least one spur gear in the torque path.

We claim:

1. A gas turbine engine comprising:
   a fan assembly comprising a plurality of fan blades; and
   a turbomachine comprising a compressor section, a combustion section, and a turbine section in serial flow order, the turbomachine comprising
      a first input power source;
      a second input power source configured to counter-rotate relative to the first input power source;
      a power output component operably connected to the fan assembly; and
      a gear assembly located forward of the combustion section of the turbomachine, the gear assembly configured to receive power from the first input power source and the second input power source and provide power to the power output component, the gear assembly comprising a helical gear, wherein the gear assembly includes a first planet gear configured to operably connect the first input power source to the power output component, wherein the first planet gear comprises the helical gear, wherein the power output component comprises an output sun gear, and wherein the helical gear is configured to mesh with the output sun gear.

2. A gas turbine engine comprising:
   a fan assembly comprising a plurality of fan blades; and
   a turbomachine comprising a compressor section, a combustion section, and a turbine section in serial flow order, the turbomachine comprising
      a first input power source;
      a second input power source configured to counter-rotate relative to the first input power source;
      a power output component operably connected to the fan assembly; and
      a gear assembly located forward of the combustion section of the turbomachine, the gear assembly configured to receive power from the first input power source and the second input power source and provide power to the power output component, the gear assembly comprising a helical gear, wherein the gear assembly comprises:
         a first planet gear configured to operably connect the first input power source to the power output component; and
         a second planet gear, wherein the second planet gear is configured to operably connect the second input power source to the power output component,
         wherein the second planet gear comprises a forward gear and an aft gear, wherein the second input power source comprises a second sun gear, wherein the power output component comprises a ring gear, wherein the forward gear of the second planet gear is configured to mesh with the ring gear, and wherein the aft gear of the second planet gear is configured to mesh with the second sun gear.

3. A gas turbine engine comprising:
   a fan assembly comprising a plurality of fan blades; and
   a turbomachine comprising a compressor section, a combustion section, and a turbine section in serial flow order, the turbomachine comprising
      a first input power source;
      a second input power source configured to counter-rotate relative to the first input power source;
      a power output component operably connected to the fan assembly;
      a gear assembly located forward of the combustion section of the turbomachine, the gear assembly configured to receive power from the first input power source and the second input power source and provide power to the power output component, the gear assembly comprising a helical gear; and
      an inter-shaft bearing positioned between the first input power source and the power output component.

4. The gas turbine engine of claim 1, wherein the helical gear is a forward gear of the first planet gear, wherein the first planet gear further comprises an aft gear, wherein the first input power source comprises a first sun gear, wherein the aft gear of the first planet gear is configured to mesh with the first sun gear of the first input power source, and wherein the aft gear of the first planet gear and the first sun gear are each configured as a helical gear.

5. The gas turbine engine of claim 1, wherein the gear assembly further comprises a second planet gear, wherein the second planet gear is configured to operably connect the second input power source to the power output component.

6. The gas turbine engine of claim 5, wherein the second planet gear comprises a forward gear and an aft gear, wherein the second input power source comprises a second sun gear, wherein the power output component comprises a ring gear, wherein the forward gear of the second planet gear is configured to mesh with the ring gear, and wherein the aft gear of the second planet gear is configured to mesh with the second sun gear.

7. The gas turbine engine of claim 6, wherein the forward and aft gears of the second planet gear, the ring gear, and the second sun gear are each configured as a helical gear.

8. The gas turbine engine of claim 6, wherein the gas turbine engine defines an axial centerline, wherein the power output component comprises a fan shaft and a shaft extension, wherein the shaft extension extends between the fan shaft and the ring gear, wherein the shaft extension defines an angle with the axial centerline greater than or equal to about 15 degrees and less than or equal to about 90 degrees.

9. The gas turbine engine of claim 5, further comprising:
a structural member, wherein the gear assembly further comprises a planet gear carrier, wherein the first planet gear and the second planet gear are each mounted to the planet gear carrier, and wherein the planet gear carrier is mounted to the structural member.

10. The gas turbine engine of claim 9, further comprising:
a carrier bearing positioned between the planet gear carrier and the power output component, wherein the carrier bearing is a thrust bearing.

11. The gas turbine engine of claim 10, wherein the power output component comprises a ring gear operably connected to the second planet gear, a fan shaft, and a shaft extension, wherein the shaft extension extends between the fan shaft and the ring gear, and wherein the carrier bearing is positioned at least partially forward of the second planet gear and at least partially aft of the shaft extension.

12. The gas turbine engine of claim 1, wherein the helical gear is a single helical gear.

13. The gas turbine engine of claim 1, wherein the turbine section comprises a counterrotating turbine having a first plurality of turbine rotor blades configured to rotate a first direction and a second plurality of turbine rotor blades configured to rotate in a second direction opposite the first direction, wherein the first input power source is rotatable with the first plurality of turbine rotor blades, and wherein the second input power source is rotatable with the second plurality of turbine rotor blades.

14. The gas turbine engine of claim 1, wherein the first input power source is a low speed input power source, and wherein the second input power source is a high speed input power source.

15. The gas turbine engine of claim 1, further comprising:
an inter-shaft bearing positioned between the first input power source and the power output component.

16. The gas turbine engine of claim 15, wherein the inter-shaft bearing is a thrust bearing.

17. The gas turbine engine of claim 16, wherein the inter-shaft bearing is configured as a thrust bearing such that a first portion of an axial load on the power output component is configured to pass through the inter-shaft bearing to the first input power source and a second portion of the axial load on the power output component is configured to pass through the gear assembly by way of the helical gear to the first input power source.

18. The gas turbine engine of claim 17, wherein a third portion of the axial load on the power output component is transferred to a structural member through a carrier bearing.

19. The gas turbine engine of claim 16, wherein a second thrust bearing located forward of the combustion section of the turbomachine and supporting the second input power source.

20. The gas turbine engine of claim 15, wherein the inter-shaft bearing is a roller bearing.

\* \* \* \* \*